United States Patent
Christens-Barry et al.

(10) Patent No.: US 12,245,043 B2
(45) Date of Patent: Mar. 4, 2025

(54) CELLULAR NETWORK SLICE CREATION AND IMPLEMENTATION PLATFORM

(71) Applicant: DISH Wireless L.L.C., Littleton, CO (US)

(72) Inventors: Owen Christens-Barry, Castle Rock, CO (US); Stacey Osborn, Arvada, CO (US); Marcel Guajardo, Lakewood, CO (US)

(73) Assignee: DISH Wireless L.L.C., Littleton, CO (US)

( * ) Notice: Subject to any disclaimer, the term of this patent is extended or adjusted under 35 U.S.C. 154(b) by 218 days.

(21) Appl. No.: 17/857,681

(22) Filed: Jul. 5, 2022

(65) Prior Publication Data

US 2024/0015517 A1 Jan. 11, 2024

(51) Int. Cl.
*H04W 16/10* (2009.01)
*H04L 41/084* (2022.01)
*H04L 41/16* (2022.01)
*H04L 41/5009* (2022.01)

(52) U.S. Cl.
CPC ........... *H04W 16/10* (2013.01); *H04L 41/084* (2013.01); *H04L 41/16* (2013.01); *H04L 41/5009* (2013.01)

(58) Field of Classification Search
CPC ... H04L 41/16; H04L 41/084; H04L 41/5009; H04W 16/10
See application file for complete search history.

(56) References Cited

U.S. PATENT DOCUMENTS

| | | | |
|---|---|---|---|
| 2017/0141973 A1* | 5/2017 | Vrzic | H04L 47/2408 |
| 2019/0312782 A1* | 10/2019 | Vaishnavi | H04L 41/0895 |
| 2020/0136911 A1* | 4/2020 | Assali | H04L 67/1008 |
| 2021/0075678 A1* | 3/2021 | Seetharaman | H04L 41/5048 |
| 2021/0306281 A1* | 9/2021 | Vilgelm | H04L 47/781 |
| 2021/0352534 A1* | 11/2021 | Tiwari | H04L 41/5009 |
| 2022/0086698 A1* | 3/2022 | Yao | H04W 28/0273 |
| 2022/0158926 A1* | 5/2022 | Wennerstrom | H04L 41/0883 |
| 2022/0263826 A1* | 8/2022 | Ping | H04W 12/35 |
| 2023/0033886 A1* | 2/2023 | Goswami | H04L 43/20 |
| 2023/0254223 A1* | 8/2023 | Boulos | H04W 24/02 370/328 |
| 2023/0276211 A1* | 8/2023 | Kozlova | H04W 4/50 455/224 |

* cited by examiner

Primary Examiner — Melanie Jagannathan
(74) Attorney, Agent, or Firm — Kilpatrick Townsend & Stockton LLP (57) ABSTRACT

Various arrangements for implementing a cellular network slice using a template are provided. Some number of client slice parameters can be defined by a client. Based on these parameters, a predefined cellular network slice template can be selected from a library of predefined cellular network slice templates. A new cellular network slice is then defined using the selected predefined cellular network slice. Cellular network access can be granted to the client via the defined cellular network slice and feedback on the performance of the cellular network slice is provided. Based on the client feedback and parameters of the defined cellular network slice, the predefined cellular network slice template in the slice template library is updated.

20 Claims, 5 Drawing Sheets

| Slice Category | Slice Sub-Category | Client Score | Admin. Score | Parameters |
|---|---|---|---|---|
| UAV Operator | Large Operator | 95 | 91 | [Parameters] |
| UAV Operator | Large Operator | 82 | 94 | [Parameters] |
| UAV Operator | Small Operator | 90 | 87 | [Parameters] |
| Gaming Access | Large Operator | 77 | 99 | [Parameters] |
| Gaming Access | Small Operator | 98 | 86 | [Parameters] |
| AR Interface | Small Operator | 88 | 85 | [Parameters] |
| Casino Equipment | No video | 99 | 95 | [Parameters] |
| Video Conferencing | 4K video | 86 | 84 | [Parameters] |
| Factory Equipment Control | Robotics | 94 | 88 | [Parameters] |

CELLULAR NETWORK SLICE CREATION AND IMPLEMENTATION PLATFORM

BACKGROUND

5G New Radio (NR) and other future cellular network standards can allow for cellular network slicing. Slicing allows for client-specific service level agreements (SLAs) to be established such that the varying parameters of each SLA are met using a dedicated virtual cellular network operating on the cellular network operator's physical cellular network. For example, a first group of user equipment (UE) mapped to a first client may be provided service based on a different set of parameters than a second group of UE mapped to a second client. Such an arrangement can allow different clients to obtain service levels or meet quality of service (QoS) metrics and/or quality of experience (QoE) metrics specific to their needs.

Creating a cellular network slice, however, can involve trial and error. A large number of parameters affecting the performance of the slice can be adjusted, possibly with unintended consequences. A client may not have the expertise to define the parameters of a cellular network slice to obtain the client's desired service level. Therefore, the client may at least in part rely on the cellular network provider to help define the parameters of the client's slice.

SUMMARY

Various embodiments are described related to a method for creating and implementing a cellular network slice. In some embodiments, a method for creating and implementing a cellular network slice is described. The method may comprise receiving, by a cellular network, a client slice parameter from a client. The method may comprise, based on the client slice parameter, selecting, by the cellular network, a predefined cellular network slice template from a plurality of predefined cellular network slice templates stored in a slice template library. The method may comprise defining, by the cellular network, a cellular network slice using the selected predefined cellular network slice. The cellular network slice may be a virtual cellular network operated on a physical cellular network. The physical cellular network may provide service for a plurality of virtual cellular networks. The method may comprise providing, by the cellular network, cellular network access via the defined cellular network slice. The method may comprise receiving, by the cellular network, client feedback about the defined cellular network slice used to provide cellular network access. The method may comprise, based on the client feedback and parameters of the defined cellular network slice, updating the predefined cellular network slice in the slice template library.

Embodiments of such a method may comprise one or more of the following features: the client slice parameter may be indicative of a category of use for the cellular network slice. The method may further comprise receiving, by the cellular network, network operator feedback about the defined cellular network slice used to provide cellular network access. Updating the predefined cellular network slice template may be further based on the network operator feedback. Updating the predefined cellular network slice template may be performed using a trained machine learning model. Each template may be mapped to a category of service of a plurality of categories of service. The network operator feedback may be indicative of a parameter of the defined cellular network slice to be further modified for the slice template library. Updating the predefined cellular network slice in the slice template library may be further based on a plurality of entries in a slice database corresponding to the category of use. The cellular network may be a 5G New Radio (NR) cellular network.

In some embodiments, a cellular network system is described. The system may comprise a cellular network. The system may comprise a slice template library. The system may comprise a slice template creation and implementation system in communication with components of the cellular network. The system may be configured to receive a client slice parameter from a client. The system may be configured to, based on the client slice parameter, select a predefined cellular network slice template from a plurality of predefined cellular network slice templates stored in the slice template library. The system may be configured to cause the cellular network to define a cellular network slice using the selected predefined cellular network slice. The cellular network slice may be a virtual cellular network operated on a physical cellular network, the physical cellular network providing service for a plurality of virtual cellular networks. The system may be configured to provide cellular network access via the defined cellular network slice. The system may be configured to receive client feedback about the defined cellular network slice used to provide cellular network access. The system may be configured to, based on the client feedback and parameters of the defined cellular network slice, update the predefined cellular network slice in the slice template library.

Embodiments of such a system may comprise one or more of the following features: the slice template creation and implementation system may be part of the cellular network. The client slice parameter may be indicative of a category of use for the cellular network slice. The system may further comprise a feedback engine functioning as part of the slice template creation and implementation system. The feedback engine may be configured to receive network operator feedback about the defined cellular network slice used to provide cellular network access. The slice template creation and implementation system being configured to update the predefined cellular network slice template may be further configured to perform the update based on the network operator feedback. The slice template creation and implementation system may comprise a trained machine learning model used to update the predefined cellular network slice template. Each template may be mapped to a category of service of a plurality of categories of service. The network operator feedback may be indicative of a parameter of the defined cellular network slice to be further modified for the slice template library. The system may further comprise a slice database. The slice template creation and implementation system being configured to update the predefined cellular network slice in the slice template library may be further based on a plurality of entries in the slice database corresponding to the category of use. The cellular network may be a 5G New Radio (NR) cellular network.

In some embodiments, a non-transitory processor-readable medium is described. The medium may comprise processor-readable instructions configured to cause one or more processors to receive a client slice parameter from a client. The one or more processors, based on the client slice parameter, select a predefined cellular network slice template from a plurality of predefined cellular network slice templates stored in a slice template library. The one or more processors may define a cellular network slice using the selected predefined cellular network slice. The cellular network slice may be a virtual cellular network operated on a physical cellular network. The physical cellular network may provide service for a plurality of virtual cellular networks. The one or more processors may provide cellular network access via the defined cellular network slice. The one or more processors may receive client feedback about the defined cellular network slice used to provide cellular network access. The one or more processors, based on the client feedback and parameters of the defined cellular network slice, may update the predefined cellular network slice in the slice template library.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A client may want to use a cellular network to obtain or provide a particular one or more services. The type of services desired by different clients can vary significantly. For example, a first client may desire to operate a network of unmanned aerial vehicles (UAVs), while a second client may desire to provide access to a group of user equipment (UE), such as smartphones, operated by the second client's employees; a third client may desire to provide wireless gaming services to its customers; and a fourth client may desire to operate a network of Internet of Things (IoT) sensor devices.

In order to satisfy each client's needs, each client may be granted access to a cellular network slice. A "cellular network slice" or simply "slice" is a virtual cellular network that operates on an underlying physical cellular network. Each slice is mapped to a set of operating parameters that control the level of service that devices connected with the slice receive. These parameters can be tailored to the particular uses or services desired by the client. For example, in the example discussed above, latency may be of little importance to the fourth client's IoT sensor network, but may be of critical importance to the first client operating the UAVs. While the third client may need a high amount of downlink bandwidth (to the UE from the cellular network) for gaming per gaming device, the first client may require relatively little downlink bandwidth per UAV. Slicing allows for an SLA and the accompanying performance of the cellular network to be tailored to each client.

While a client may be desirous of having access to a slice tailored to their needs, the client may not have the information or sophistication necessary to be able to define the parameters of the slice needed to realize the client's goals. Without such information, the client and the cellular network operator (which can also be referred to as a mobile network operator, MNO) may need to perform a significant number of iterations of the parameters of the cellular network slice in order to arrive at a set of parameters that sufficiently meet the client's needs, while not being overly inefficient (and overly costly) due to devoting too great of an amount of cellular network resources to the slice.

Embodiments detailed herein are focused on an MNO creating a set of slice templates based on feedback from clients. The slice templates can be used for future clients to use a starting point for creating a slice. Each slice template can be mapped to one or more particular use cases. Additional feedback from the MNO can be incorporated. A library of many slices can be used to create a smaller library of slice templates. Based on the type of service that a client desires to offer, a slice template corresponding to the type of service can be used to define a slice as a starting point for the client. The client can then use the slice, test the slice, and/or modify particular parameters. Such an arrangement can greatly reduce the number of iterations that the client and MNO need to perform in order to arrive at a defined slice that adequately meets the client's needs.

Figure 1:
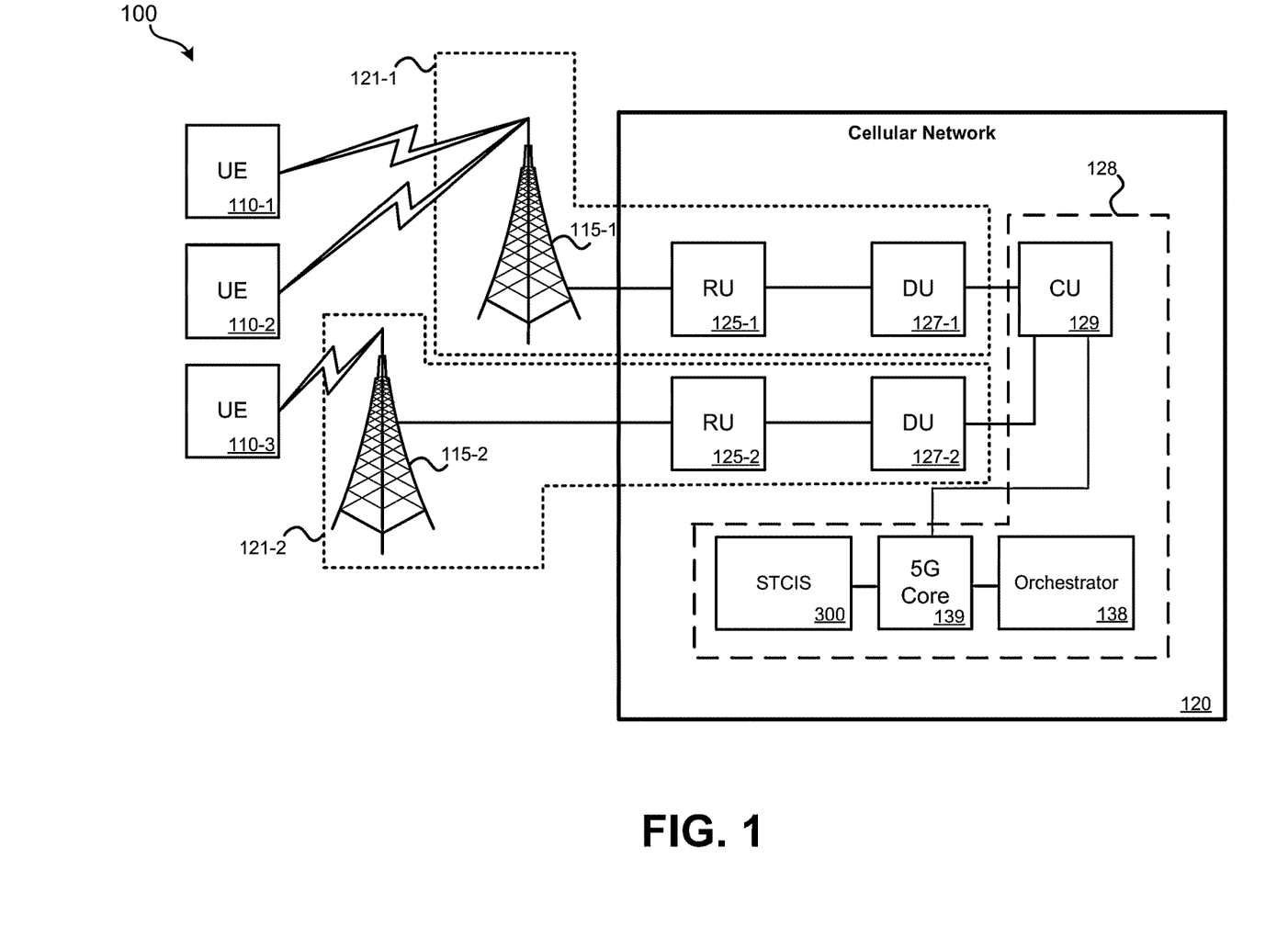
FIG. 1 illustrates a block diagram of a cellular network on which slicing may be performed.

Slicing can be performed on cellular networks that operate according to various standards. In some embodiments, the cellular network can be a 5G New Radio (NR) cellular network. Future generations of cellular networks may also use slicing, such as 6G and 7G cellular networks. FIG. 1 illustrates a block diagram of a cellular network system ("system 100") on which slicing may be performed. System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; Slice Template Creation and Implementation System 300 ("STCIS 300"); and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed, or a hybrid arrangement which can use an on-premises data center and cloud computing functionality. Detail regarding STCIS 300 is provided in relation to FIG. 3.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and/or orchestrator 138 can be implemented virtually as software being executed by general-purpose computing equipment, such as in a data center, as detailed herein. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; latency; access to particular services; and maximum permissible jitter; area of service; delay tolerance; energy efficiency; isolation level and security parameters; positioning support, methods, and/or accuracy; user data access; tunneling; supported data networks; available services (e.g., IMS support, mission critical services, push to talk, etc.); customer provided network functions (e.g., AAA, customer-owned UPF); particular RF bands supported; duration of need for slice (open date/time and close date/time); and level of exclusivity needed (e.g., 100% exclusive, or open to sharing).

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
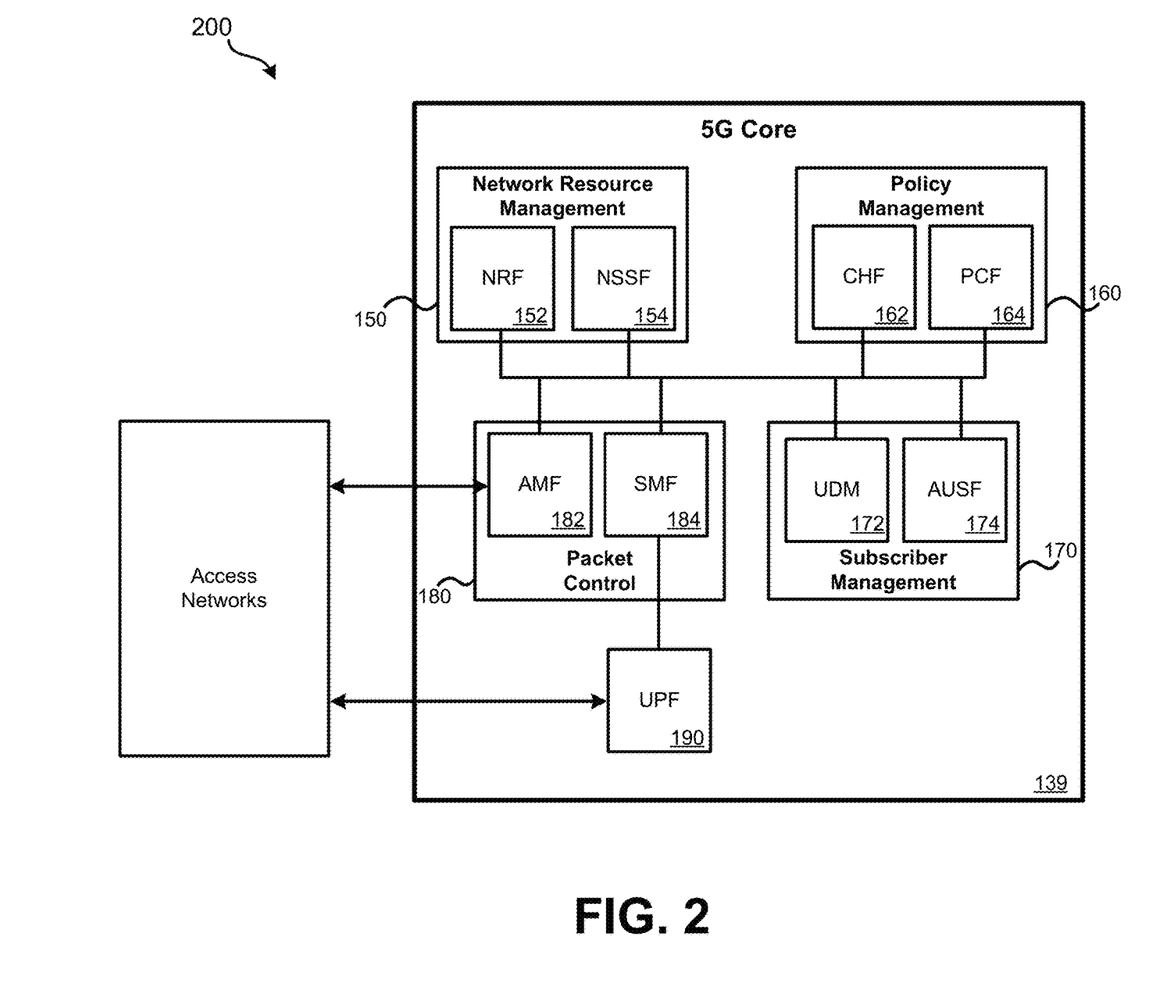
FIG. 2 illustrates a block diagram of a cellular network core.

FIG. 2 illustrates a block diagram of a cellular network core, which can represent 5G core 139. 5G core 139, which can be physically distributed across data centers or located at a central national data center (NDC), can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
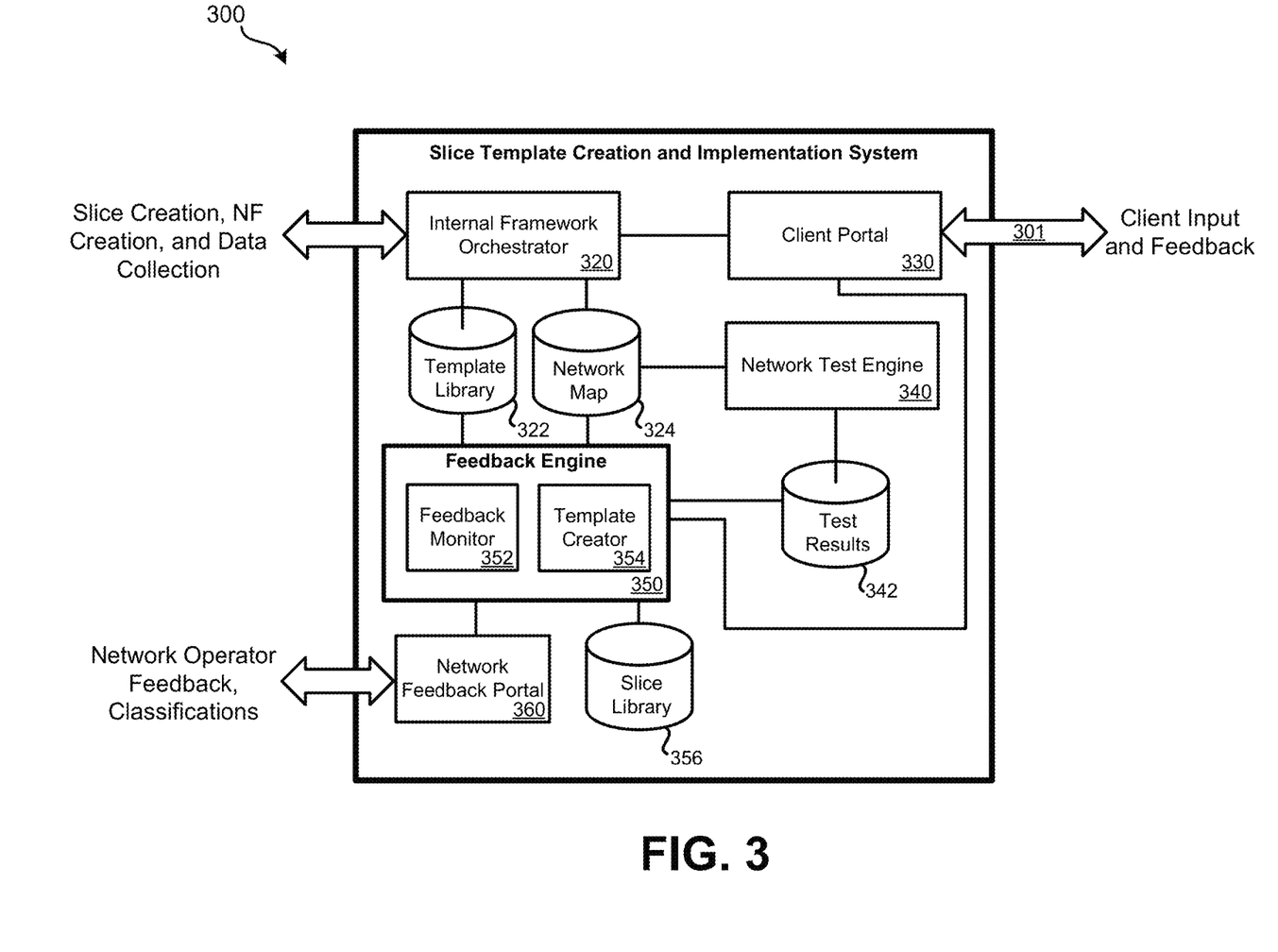
FIG. 3 illustrates a block diagram of an embodiment of a slice template creation and implementation system.

FIG. 3 illustrates a block diagram of an embodiment of a slice template creation and implementation system 300 ("system 300"). System 300 can include: internal framework orchestrator 320; client portal 330; network test engine 340; feedback engine 350; and network feedback portal 360. To perform the functions of these components, one or more special-purpose or general-purpose processors may be used. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The functions of these components can be implemented using a cloud-computing platform, which can be operated by a separate cloud-service provider that executes code and provides storage.

System 300 can further include various data storage arrangements, including: template library 322; network map 324; test results database 342; and slice library 356. Such data storage arrangements are implemented using non-transitory processor-readable mediums, such as HDDs or SSDs. On a cloud-computing platform, storage may be located at one data center or distributed across multiple data centers.

Client portal 330 can represent an interface through which a client makes an initial request for a slice via client input 301. The client may provide basic information to system 300 such as: the desired use of the slice; the number of devices to connect with the slice; the geographic region in which the slice is to be operated. If the client is aware of one or more parameters that the slice is required to have or exceed, the client can specify via client portal 330. In some embodiments, such information may be provided via another method, such as via telephone to a representative of the MNO.

Template library 322 can store various templates that can be used to define the parameters for a network slice. Internal framework orchestrator 320 may use the information obtained from client portal 330 and template library 322 to initially configure a cellular network slice for the client. Based on the desired use of the slice, a correct template may be identified within template library 322 as a starting point. If the client requested that one or more particular parameters be met or exceeded, such parameters may be incorporated as part of the cellular network slice created by internal framework orchestrator 320.

Internal framework orchestrator 320 may then create and configure the cellular network slice on the cellular network, such as cellular network 120. Creation of the cellular network slice can include creating network functions as part of 5G core 139 to service the slice. The slice, as created for the client, may be stored to slice library 356.

The created cellular network slice may be made available to the client for all or a subset of the client's UE for testing or use. After a time, via client portal 330, the client may be requested to provide feedback about the slice. The feedback requested can include a score (e.g., a numeric or letter grade) for one or more aspects of the slice. In some embodiments, the feedback can be a single all-encompassing score. In other embodiments, the feedback can constitute multiple scores given on different aspects of the slice. This feedback can be used by feedback monitor 352 of feedback engine 350 to store in slide library 356 along with a definition of the slice and serve as a basis to modify one or more parameters of the slice. The client may be permitted to request changes to slice parameters as much as necessary to optimize the performance and cost of the slice for the client. The feedback provided by the client may in some embodiments only be collected once the client has arrived at a set of finalized slice parameters.

In addition to obtaining feedback from the client, feedback can be obtained from an administrator of the MNO. The administrator may provide network feedback portal 360 with various forms of feedback that is indicative of an administrator score (e.g., a numeric or letter grade) of the slice from the MNO's perspective. For example, a slice that results in a significant profit margin may be given a high score. Network feedback portal 360 may also receive various feedback, either from an administrator or from another system, that is indicative of characteristics that can be incorporated as part of the network feedback. For example, a slice that includes relatively high utilization of network resources may be provided with a higher score. (That is, a slice that averages 75% processing resource utilization may be more efficient and useful both for the MNO and the client than a slice that averages 55% processing resource utilization.) Feedback received by network feedback portal 360 can be stored by feedback monitor 352 in association with the definition of the slice in slice library 356.

Network test engine 340 can periodically or occasionally run tests on slices of the cellular network. This testing can be used to determine how well a slice can function if the cellular network is not performing optimally. Such testing can involve chaos testing, in which a failure is simulated on the network and the performance of a slice during the failure is evaluated. Such testing may be performed in a development environment as opposed to the production environment. As an example, the more resilient the slice is when chaos is applied to the slice, the higher the score that may be awarded. To create the slice in the development environment, network map 324 may be accessed. Network map 324 can indicate a logical and physical map of how all components of the cellular network are connected, the processing resources present on the network, the utilization of processing resources and bandwidth, network traffic, etc. Results of network testing may be stored to test results database 342. A separate test score may be mapped to a slice in slice library 356 or may be accessible from test results database 342. In some embodiments, the testing score is incorporated as part of the network operator feedback.

Periodically or occasionally, template creator 345 of feedback engine 350 can access slice library 352, such as once per day. Template creator 345 may analyze each slice that is currently active on the cellular network and, possibly, slices that are inactive. In some embodiments, inactive slices, if used, have their score negatively adjusted based on being inactive. Template creator 345 may analyze the scores available for each slice. Template creator 354 can select a particular "best-in-class" slice based on the scores for inclusion in template library 322. That is, the highest scoring slice for a particular slice category can be included in template library. In some embodiments, a predefined number of slices for each category can be included in template library 322. The category for each slice may have been received either via client portal 330 or from the network administrator via network feedback portal 360.

The scores may be averaged together or may otherwise be combined to create a ranking of slices within a particular category. For example, a weighting could be used. If three scores are present, an example of a weighting could be 60% for the customer's score, 30% for the network administrator score, and 10% based on the network test results.

$$\text{Weighted Score} = W_1 C_S + W_2 A_S + W_3 N_S \qquad \text{Eq. 1}$$

As a more generic example, in equation 1, weights $W_1$, $W_2$, and $W_3$ can be set in order to relatively weigh the customer score ($C_S$), administrator score ($A_S$), and network test result score ($N_S$).

In other embodiments, multiple slice definitions within a category having a score above a defined threshold may be combined in order to create a template for the category. For example, if a customer provides a score over a particular defined value, the definition of the slice may be used in creating the template for the category. If a customer provides a score below a threshold value, the parameters of the slice may not be used for creating the template or may be actively avoided, since such parameters resulted in a low customer score. If multiple slices within a category qualify for inclusion, when the same parameter is used across the multiple qualifying slices, the value of the parameter may be averaged or otherwise combined. Such an arrangement may be beneficial if not all of the same parameters are defined across slices within a category. The template may then be able to contain a compilation of the values of parameters of slices within the category that clients have been satisfied with (and, possibly, which meet threshold scores for the network test and/or the network administrator).

In some embodiments, each slice created for the network may not be categorized. An unsupervised clustering algorithm may be used to cluster slice definitions that are determined to be adequately similar. Each parameter of the network slices may be treated as a dimension. Once clustered, the parameters of clustered network slice definitions may be averaged or otherwise combined together to create a template. An administrator may then tag the template with a particular category definition. For example, the administrator may review which slices have been clustered together and to which clients such slices are mapped. The template created from the cluster may then have one or more tags applied such that in the future the template can be applied to clients that have similar needs as the clients corresponding to the clustered slices.

In other embodiments, a machine learning (ML) model may be used to create the templates. A ML model may be trained using a training set of data. In this example, the training set of data may be slice definitions (with each definition including some number of slice parameters) that are mapped to one or more scores and to the category of the slice. Alternatively, ML models may be trained and applied separately for each category or subcategory. Scores can be used by the ML model to weigh slice parameters that tend to result in high scores or low scores. Parameters that result in low scores may tend to be avoided by the ML model, while parameters that result in high scores may tend to be targeted. The trained ML model may be a multi-layer neural network or some other form of ML model.

In other embodiments, for an ML model to create a new template, a client may provide some baseline inputs to the machine learning model such as the purpose or intent of the slice or service (e.g., general data, voice, drone, etc.), expected outcomes, or QoS/QoE parameters which could be experiential or technical in nature depending on the client type (e.g., throughput, latency, jitter, etc., or service types, such as 4K streaming video, conversational video, etc.), and some general information around expected number of devices, location, if the devices will be stationary or moving, etc. Some inputs may lead the ML model to request additional input. In the end, the ML model translates the requirements received as input into a common language (e.g., if the requirements are more experiential than technical, the ML model could first do some translation and/or abstraction, which might involve additional ML algorithms or data sets) and would run it against all of the trained/validated data to identify a set of suggested parameters and, possibly, a confidence score. The confidence score could be used by the client to decide if they want to accept the configuration or go back and answer some additional questions in order to try and get a higher confidence level before deploying the solution.

To create an initial training data set, direct client feedback may be used in which a client answers a series of questions around how well a given slice or template is meeting their specified needs and requirements. This arrangement can help determine which parameters are impacting client experience. Additional feedback loops can be used to infer the success of a given ML model such as how often clients are making changes, how often clients are reaching out to care for performance issues, etc. The algorithm or ML model used can weigh data points differently based on like versus non-like use cases, explicit feedback versus inferred feedback, etc.

Ultimately the goal of the algorithm or ML model can be to allow clients to provide requirements in the language that is known and comfortable to them and receive back a customized or suggested configuration that can be applied to meet those needs. Further, an ML model could be used to apply new learnings (from any/all existing slices) to other existing slices in order to further optimize them over time. (For example, if more information around the impacts of arboreal interference on latency becomes known based on one slice's performance, an ML model can identify similar existing slices and then apply the same learnings such that the interference is reduced there as well.)

In addition to slice categorization, one or more subcategorizations may be used. For example, while the overarching category may be "UAV control", a sub-categorization may be "small operator" indicating that the client operates less than 100 UAVs. Another sub-categorization may be "large operator" indicating that the client operates more than 100 UAVs, by way of example only.

The created templates can be stored to template library 322. Previously stored templates can be replaced or modified based on the templates created by template creator 354. When a client accesses client portal 330 (or otherwise communicates with the MNO), the templates present in template library 322 are available as a starting point for defining a slice for the client.

Figure 4:
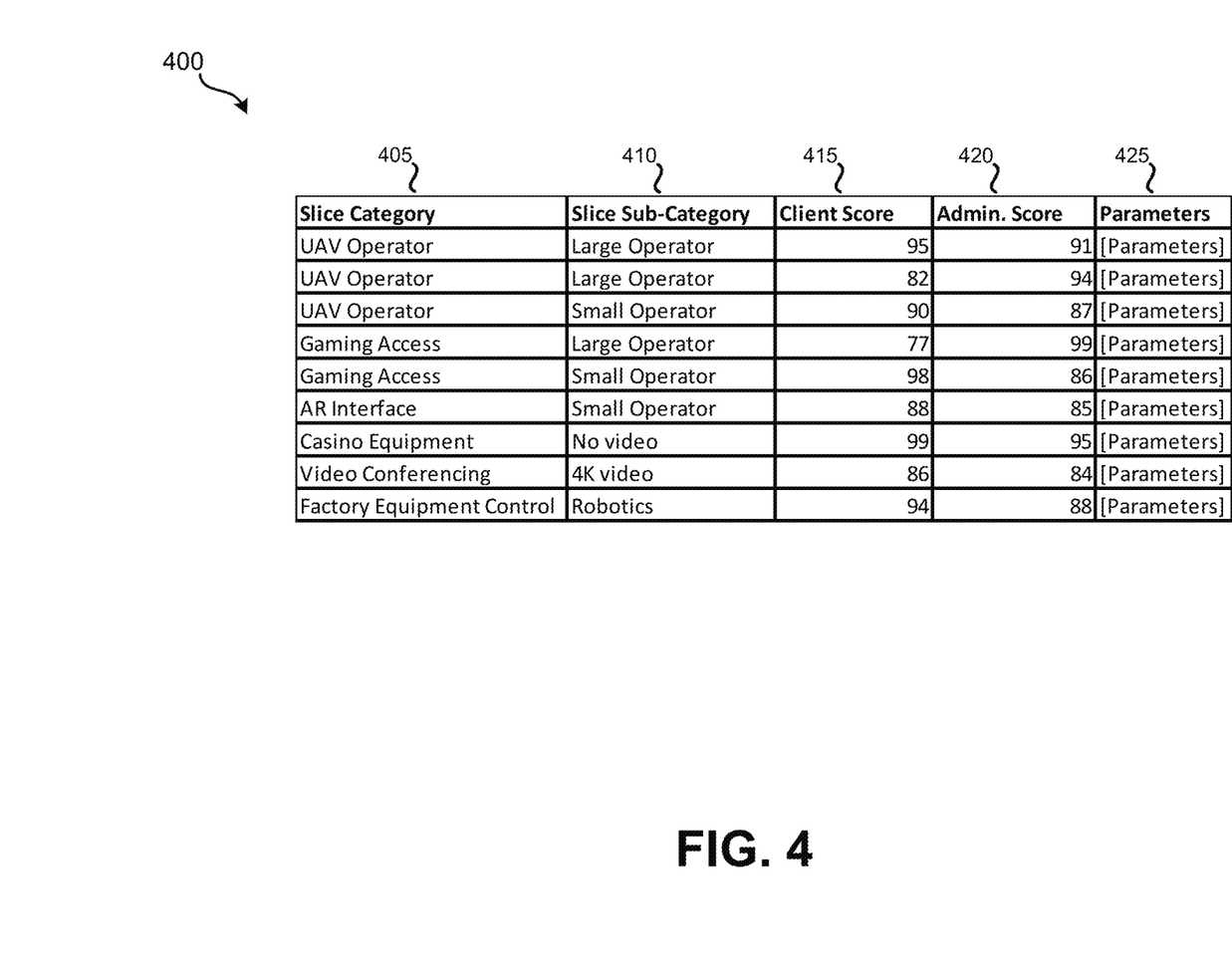
FIG. 4 illustrates database entries of a slice library that can be used to create a slice template library.

FIG. 4 illustrates database entries of a slice library 400 that can be used to create a slice template library. In slice library 400, each row corresponds to a slice that is either active or inactive on the cellular network. Slice category 405 can be assigned by the client or the network administrator, or based on a clustering algorithm with a tag applied by a network administrator. Slice sub-category 410 may be present and may provide an additional level of categorization. For example, within slice category 405, a template may be created for each available slice sub-category. Zero, one, or more than one sub-categories may be present within any given slice category.

In slice library 400, only two scores are present: client score 415 and administrator score 420. In other embodiments, fewer scores (e.g., only a client score) or more scores (e.g., addition of a network test score) may be present. Further, each score may be broken down into multiple sub-scores. For example, client score 415 may be broken down into a client performance score and a client cost score.

For each slice in slice library 400, the slice's parameters 425 may be stored. In some embodiments, while a slice may have geography-specific parameters (e.g., the slice is only available in a particular region), such geography-specific parameters may be stripped out if used to create a template.

As detailed in relation to template creator 354, using the one or more assigned scores, a slice definition may be imported into template library 322 or may be used to create a template. Each template can be mapped to a particular slice category and, possibly, at least one slice sub-category within the slice category.

A template library may contain entries similar to slice library 400, but as selected or created by template creator 354. An administrator of the MNO can be permitted to edit the templates, create additional templates, or delete templates as desired.

Figure 5:
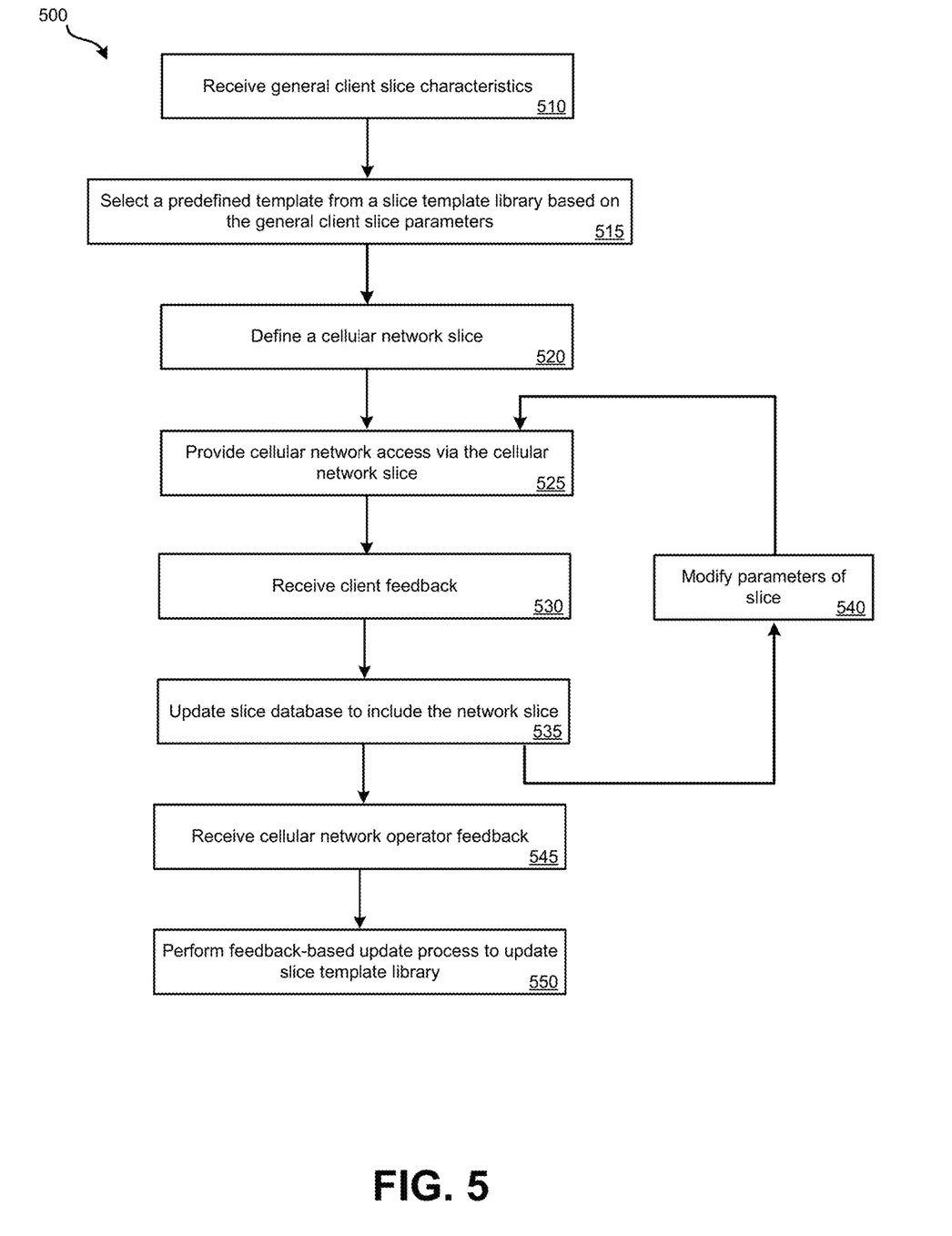
FIG. 5 illustrates an embodiment of a method for creating and implementing a cellular network slice using a template.

Various methods may be performed using the networks, systems, and arrangements detailed in FIGS. 1-4. FIG. 5 illustrates an embodiment of a method for creating and implementing a cellular network slice using a template. Method 500 can be performed using system 300 of FIG. 3, which can be implemented within cellular network 100 of FIG. 1.

At block 510, one or more general slice characteristics may be received from a client. The one or more general slice characteristics received from the client at block 510 can include a category and, possibly, a subcategory indicative of a type of service that the client desires to use a slice for. The category and sub-category may be selected from a predefined list for which the MNO has templates available. Additional characteristics may also be provided by the client, such as one or more slice parameters that the client desires to be included in the slice. The client may also indicate a geographic region in which the slice is to be active.

At block 515, based on the general client characteristics received at block 510, such as the category and subcategory, the characteristics are used to select a predefined template from the slice template library. These templates may have been created based on previous iterations of method 500 having been performed.

At block 520, a cellular network slice may be defined at least partially based on the selected predefined template from block 515 if, at block 510, the client defined any particular slice parameters that were required to be included in the slice; the selected predefined template may be modified to include the required parameter. In some embodiments, if method 500 is being performed but no relevant template corresponding to the clients category or subcategory has been created yet, the cellular network slice of block 520 may be defined by an administrator of the MNO. At block 525, cellular network access may be provided to the client via the defined cellular network slice of block 520. Through this access, the client may be able to determine if the defined cellular network slice is sufficient for the client's needs.

At block 530, feedback may be provided by the client via one or more values (e.g., scores, letter grades) corresponding to one or more categories, such as overall satisfaction, cost satisfaction, performance satisfaction, etc. The feedback of block 530 may only be requested after the client has had ample time to test the slice, such as one week or a month. At block 535, the slice parameters and associated category and, possibly, subcategory may be stored to a slice database.

If the client desires the slice to be modified, block 540 may be performed with either the client or an administrator of the MNO identifying one or more parameters of the slice that are to be modified to better realize the client's goal (which could be optimization between performance and cost). Blocks 525-540 may be repeated as many times as is necessary to obtain the client's desired slice characteristics.

At block 545, feedback may be received from an administrator of the MNO and/or a score may be received based on network testing. These scores can be stored in the slice library in association with the parameters of the slice, categories of the slice, and/or client feedback of the slice. In some embodiments, a slice is only used for template creation if the slice has been active for a predefined amount of time and the client has ceased modifying the slice for a predefined period of time (e.g., 2 months).

At block 550, occasionally or periodically, a template creation or modification process can be performed, as detailed in relation to template creator 354. Based upon the feedback obtained from one or more sources, one or more templates for each category or sub-category may be updated, modified, or created. Before a template is added or modified in a template library, an administrator of the MNO may have the option to approve, edit, or delete the modifications or new template.

Going forward, the feedback on the slice created at block 520 and the slice parameters the client was ultimately happy with are used to create or modify a slice template for the future such that a future client desirous of operating in the same category or sub-category of service as the client can leverage the created or modified template.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for creating and implementing a cellular network slice, the method comprising:
receiving, by a cellular network, a client slice parameter from a client;
based on the client slice parameter, selecting, by the cellular network, a predefined cellular network slice template from a plurality of predefined cellular network slice templates stored in a slice template library;
defining, by the cellular network, a cellular network slice using the selected predefined cellular network slice, wherein:
the cellular network slice is a virtual cellular network operated on a physical cellular network, the physical cellular network providing service for a plurality of virtual cellular networks;
providing, by the cellular network, cellular network access via the defined cellular network slice;
receiving, by the cellular network via a client portal, client feedback about the defined cellular network slice used to provide cellular network access;

accessing, by the cellular network, a network map that logically represents components present on the cellular network, processing resources present on the cellular network, bandwidth of the cellular network, and traffic present on the cellular network;

performing, by the cellular network, chaos testing on the defined cellular network slice based on the network map;

creating, by the cellular network, a test score for the defined cellular network slice based on the performed chaos testing on the defined cellular network slice based on the network map; and based on the client feedback, parameters of the defined cellular network slice, and the test score based on the performed chaos testing, updating the predefined cellular network slice template in the slice template library.

2. The method for creating and implementing the cellular network slice of claim 1, wherein the client slice parameter is indicative of a category of use for the cellular network slice.

3. The method for creating and implementing the cellular network slice of claim 1, further comprising:
receiving, by the cellular network, network operator feedback about the defined cellular network slice used to provide cellular network access.

4. The method for creating and implementing the cellular network slice of claim 3, wherein updating the predefined cellular network slice template is further based on the network operator feedback.

5. The method for creating and implementing the cellular network slice of claim 1, wherein updating the predefined cellular network slice template is performed using a trained machine learning model.

6. The method for creating and implementing the cellular network slice of claim 1, wherein each template is mapped to a category of service of a plurality of categories of service.

7. The method for creating and implementing the cellular network slice of claim 4, wherein the network operator feedback is indicative of a parameter of the defined cellular network slice to be further modified for the slice template library.

8. The method for creating and implementing the cellular network slice of claim 2, wherein updating the predefined cellular network slice in the slice template library is further based on a plurality of entries in a slice database corresponding to the category of use.

9. The method for creating and implementing the cellular network slice of claim 1, wherein the cellular network is a 5G New Radio (NR) cellular network.

10. A cellular network system, comprising:
a cellular network;
a slice template library; and
a slice template creation and implementation system in communication with components of the cellular network, the slice template creation and implementation system configured to:
receive a client slice parameter from a client;
based on the client slice parameter, select a predefined cellular network slice template from a plurality of predefined cellular network slice templates stored in the slice template library;
cause the cellular network to define a cellular network slice using the selected predefined cellular network slice, wherein:
the cellular network slice is a virtual cellular network operated on a physical cellular network, the physical cellular network providing service for a plurality of virtual cellular networks;
provide cellular network access via the defined cellular network slice;
receive client feedback about the defined cellular network slice used to provide cellular network access;
access a network map that logically represents components present on the cellular network, processing resources present on the cellular network, bandwidth of the cellular network, and traffic present on the cellular network;
perform chaos testing on the defined cellular network slice based on the network map;
create a test score for the defined cellular network slice based on the performed chaos testing on the defined cellular network slice based on the network map; and
based on the client feedback, parameters of the defined cellular network slice, and the test score based on the performed chaos testing, update the predefined cellular network slice template in the slice template library.

11. The cellular network system of claim 10, wherein the slice template creation and implementation system is part of the cellular network.

12. The cellular network system of claim 10, wherein the client slice parameter is indicative of a category of use for the cellular network slice.

13. The cellular network system of claim 10, further comprising:
a feedback engine functioning as part of the slice template creation and implementation system, the feedback engine configured to receive network operator feedback about the defined cellular network slice used to provide cellular network access.

14. The cellular network system of claim 13, wherein the slice template creation and implementation system being configured to update the predefined cellular network slice template is further configured to perform the update based on the network operator feedback.

15. The cellular network system of claim 10, wherein the slice template creation and implementation system comprises a trained machine learning model used to update the predefined cellular network slice template.

16. The cellular network system of claim 10, wherein each template is mapped to a category of service of a plurality of categories of service.

17. The cellular network system of claim 14, wherein the network operator feedback is indicative of a parameter of the defined cellular network slice to be further modified for the slice template library.

18. The cellular network system of claim 12, further comprising:
a slice database, wherein the slice template creation and implementation system being configured to update the predefined cellular network slice in the slice template library is further based on a plurality of entries in the slice database corresponding to the category of use.

19. The cellular network system of claim 10, wherein the cellular network is a 5G New Radio (NR) cellular network.

20. A non-transitory processor-readable medium, comprising processor-readable instructions configured to cause one or more processors to:
receive a client slice parameter from a client;
based on the client slice parameter, select a predefined cellular network slice template from a plurality of predefined cellular network slice templates stored in a slice template library of a cellular network;

define a cellular network slice using the selected predefined cellular network slice, wherein:
  the cellular network slice is a virtual cellular network operated on a physical cellular network, the physical cellular network providing service for a plurality of virtual cellular networks;
provide cellular network access via the defined cellular network slice;
receive client feedback about the defined cellular network slice used to provide cellular network access;
access a network map that logically represents components present on the cellular network, processing resources present on the cellular network, bandwidth of the cellular network, and traffic present on the cellular network;
perform chaos testing on the defined cellular network slice based on the network map;
create a test score for the defined cellular network slice based on the performed chaos testing on the defined cellular network slice based on the network map; and
based on the client feedback, parameters of the defined cellular network slice, and the test score based on the performed chaos testing, update the predefined cellular network slice template in the slice template library.

* * * * *